United States Patent
Huang et al.

(10) Patent No.: US 9,122,580 B2
(45) Date of Patent: Sep. 1, 2015

(54) FLASH MEMORY SYSTEM AND MANAGING AND COLLECTING METHODS FOR FLASH MEMORY WITH INVALID PAGE MESSAGES THEREOF

(75) Inventors: Po-chun Huang, New Taipei (TW); Yuan-hao Chang, Tainan (TW); Jen-wie Hsieh, Taipei (TW); Yung-feng Lu, New Taipei (TW); Chia-lin Chang, Taipei (TW)

(73) Assignee: GENESYS LOGIC, INC., Shindian, Taipei (TW)

(*) Notice: Subject to any disclaimer, the term of this patent is extended or adjusted under 35 U.S.C. 154(b) by 964 days.

(21) Appl. No.: 13/244,328

(22) Filed: Sep. 24, 2011

(65) Prior Publication Data
US 2012/0284450 A1 Nov. 8, 2012

(30) Foreign Application Priority Data
May 6, 2011 (TW) .............................. 100115987 A

(51) Int. Cl.
*G06F 12/02* (2006.01)
(52) U.S. Cl.
CPC .... *G06F 12/0246* (2013.01); *G06F 2212/7205* (2013.01); *G06F 2212/7209* (2013.01)
(58) Field of Classification Search
None
See application file for complete search history.

(56) References Cited

U.S. PATENT DOCUMENTS

| | | | |
|---|---|---|---|
| 8,370,602 B2 | 2/2013 | Chen et al. | |
| 8,549,212 B2 | 10/2013 | Lu | |
| 2002/0166022 A1* | 11/2002 | Suzuki | 711/103 |
| 2008/0114940 A1* | 5/2008 | Ito | 711/128 |
| 2008/0244166 A1* | 10/2008 | Tsai et al. | 711/103 |
| 2010/0064095 A1* | 3/2010 | Chen et al. | 711/103 |
| 2010/0115188 A1 | 5/2010 | Lee | |
| 2010/0115226 A1* | 5/2010 | Ueno | 711/173 |
| 2010/0281207 A1* | 11/2010 | Miller et al. | 711/103 |
| 2010/0325373 A1* | 12/2010 | Kawamura et al. | 711/154 |
| 2010/0325524 A1* | 12/2010 | Yang et al. | 714/773 |
| 2011/0035548 A1* | 2/2011 | Kimmel et al. | 711/114 |
| 2011/0202708 A1* | 8/2011 | Ash et al. | 711/103 |
| 2012/0066443 A1 | 3/2012 | Li | |
| 2012/0198131 A1* | 8/2012 | Tan et al. | 711/103 |
| 2012/0246415 A1* | 9/2012 | Teo | 711/154 |

FOREIGN PATENT DOCUMENTS

| | | |
|---|---|---|
| CN | 1262754 | 8/2000 |
| EP | 2400397 | 12/2011 |
| TW | 200951711 | 12/2009 |
| TW | 201104690 | 2/2011 |

* cited by examiner

*Primary Examiner* — Sean D Rossiter

(57) ABSTRACT

A flash memory system and managing and collecting methods for flash memory with invalid page messages thereof are described. When the valid data pages of the flash memory are changed to invalid data pages, a recording area is used to record the message of the invalid data pages to effectively collect the occupied space of the invalid data pages in the flash memory. Further, while garbage collecting step is performed, a block is rapidly selected according to the message of the recording area and the valid data pages in the selected block are correctly identified, copied and removed.

34 Claims, 8 Drawing Sheets

FLASH MEMORY SYSTEM AND MANAGING AND COLLECTING METHODS FOR FLASH MEMORY WITH INVALID PAGE MESSAGES THEREOF

FIELD OF THE INVENTION

The present invention relates to a memory system and managing and collecting methods for memory with invalid page messages thereof, and more particularly to a flash memory system and managing and collecting methods for flash memory with invalid page messages thereof.

BACKGROUND OF THE INVENTION

The flash memory is composed of a plurality of pages wherein 64 pages or 128 pages are defined as one block to be a storage unit of the flash memory. However, after the data are written to one page of the flash memory, the updated data cannot be over-written to the page with the previous written data. It is required to erase the block associated the written page before the later updated data are recorded in the written page. Such the manner of erasing and over-writing steps takes a lot of operation time. Thus, the updated data for the page usually are written to another physical address corresponding to the same logical address of the original page.

For example, the data of logical address "100" are stored in physical address "150" and the updated data are written to another physical address "200" when the updated data are written to the logical address "100" to replace the previous data in the same logical address "100" wherein the physical address "150" and physical address "200" are disposed in different blocks, respectively. Therefore, there are two versions of data with the logical address "100" wherein the physical address "150" is regarded as "invalid data page". However, if the updated data corresponding to the logical address "100" are continuously written, the invalid pages with old versions are gradually increased one by one, which occupies a large amount of physical addresses. Thus, it is necessary to collect the physical addresses of the "invalid data page" in the logical address "100" for increasing the available pages of the flash memory.

The collection of the old versions of invalid data pages is termed as "garbage collection" (GC). However, when performing GC procedure, it is required to determine whether the pages in the block are valid or invalid. Conventionally, a flag is recorded in the spare area of one page if the page becomes invalid. This manner is only applicable to single-level cell (SLC) but not applicable to multi-level cell (MLC) because the MLC memory is only written once. In another conventional technique, if all the statuses of pages in the flash memory are recorded respectively as "valid" or "invalid", it disadvantageously consumes a lot of memory for storing the statuses.

Additionally, in the application of flash memory, the mapping relationship between the logical address and physical address is limited. That is, the data with the same logical block are usually stored in the same physical block. Since the hot data, which are usually accessed, and cold data, which are seldom accessed, may be stored in the same logical block, it is necessary to scan all the pages of the physical block corresponding to the same logical block while determining whether the pages in the physical block are valid or invalid, which results in degraded efficiency of the GC procedure.

Consequently, there is a need to develop a novel management method of the invalid data page for the flash memory to solve the aforementioned problems.

SUMMARY OF THE INVENTION

One objective of the present invention provides a flash memory system and managing and collecting methods for flash memory with invalid page messages thereof for collecting a large amount of invalid data pages of the flash memory by using the address information of the invalid data page messages stored in the recording area while the valid data pages are changed from valid data pages to invalid data pages.

Another objective of the present invention provides a flash memory system and managing and collecting methods for flash memory with invalid page messages thereof for rapidly selecting proper data blocks and identifying the valid data pages in the selected blocks for duplication according to the address information of the invalid data page messages stored in the recording area while performing collecting steps of the flash memory.

In first embodiment, a flash memory system comprises:
a flash memory controller having a processing unit; and
a flash memory coupled to the flash memory controller and having a reserved area and a data area, wherein the reserved area has a recording area and the data area has a plurality of valid data pages and a plurality of invalid data pages and wherein the processing unit controls the recording area for recording a plurality of invalid data page messages corresponding to the invalid data pages, respectively.

In second embodiment, a flash memory system comprises:
a flash memory controller having a processing unit;
a flash memory coupled to the flash memory controller and having a data area, wherein the data area has a plurality of valid data pages and a plurality of invalid data pages; and
a storage device coupled to the flash memory controller and having a recording area for recording a plurality of invalid data page messages corresponding to the invalid data pages, respectively.

In third embodiment, a method of managing a plurality of invalid data pages in a flash memory wherein the flash memory has a plurality of valid data pages and a plurality of empty pages, the method comprises the steps of:
(a) executing a updating procedure of the plurality of valid data pages;
(b) converting the plurality of valid data pages into a plurality of invalid data pages wherein each of the invalid data pages has an invalid data page message;
(c) writing the invalid data page messages of the plurality of invalid data pages into a recording area;
(d) determining whether it is required to re-arrange the recoding area, if yes, proceed to step (e) and if no, proceed to step (f);
(e) re-arranging the recording area; and
(f) end.

In fourth embodiment, a method of collecting a plurality of invalid data pages in a flash memory, wherein the flash memory has a plurality of blocks including at least one data block and at least one empty block, and wherein the at least one data block has a plurality of invalid data pages and a plurality of valid data pages, the method comprises the steps of:
(a) triggering a collecting procedure;
(b) reading a recording area of the flash memory for acquiring a plurality of invalid data page messages;

(c) selecting the data block based on the invalid data page messages and copying the valid data page of the data block to the empty block; and (d) erasing the selected data block.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
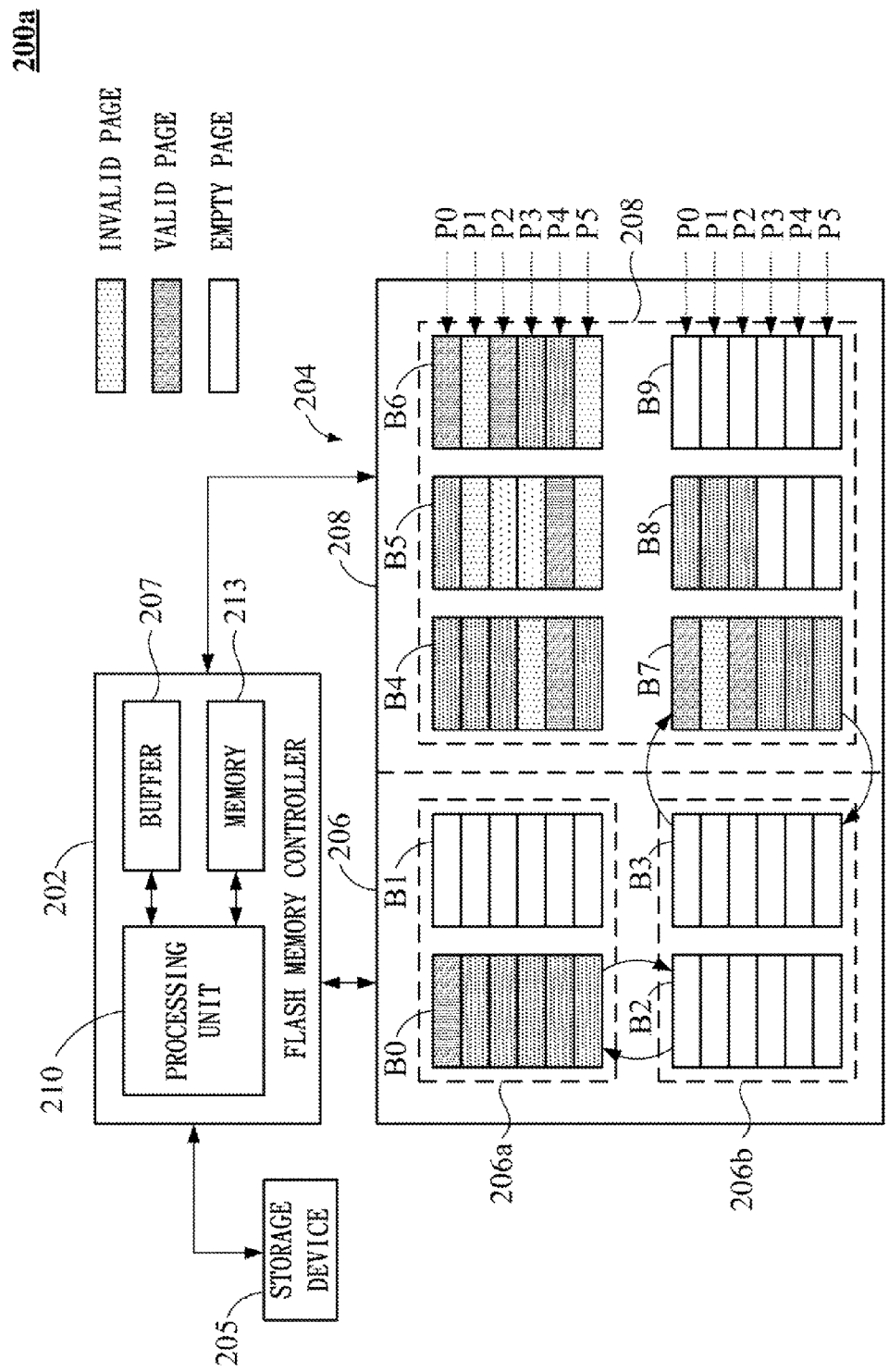
FIG. 1A is a schematic block diagram of a management system of the invalid data page messages in the flash memory according to a first embodiment of the present invention.

FIG. 1A is a schematic block diagram of a management system 200a of the invalid data page messages in the flash memory according to a first embodiment of the present invention. The management system 200a includes a flash memory controller 202, a flash memory 204 coupled to the flash memory controller 202, and a storage device 205 coupled to the flash memory controller 202. The flash memory controller 202 further includes a processing unit 210, a buffer 207 and a memory 213 respectively coupled to the processing unit 210. The management system 200a and method thereof of the invalid data page messages in the flash memory 204 of the present invention are applicable to the flash memory having single-level cell (SLC), multiple-level cell (MLC) and triple-level cell (TLC), and various kinds of flash memory.

The flash memory 204 further includes a reserved area 206 and a data area 208. The reserved area 206 and data area 208 are coupled to the processing unit 210. The difference between the reserved area 206 and data area 208 is that the user can utilize the blocks within the data area 208 but cannot directly use the blocks within the reserved area 206. The flash memory controller 202 is capable of accessing, i.e. reading and writing, the reserved area 206 and data area 208. The reserved area 206 further includes a recording area 206a and an empty spare area 206b. For example, the recording area 206a has blocks B0, B1 and the empty spare area 206b has blocks B2, B3 which are empty blocks, wherein each block is composed of 6 pages. The data area 208 is composed of blocks B4 through B9 wherein each block is composed of 6 pages.

Each block is composed of a plurality of pages which are classified into valid data pages, invalid data pages and/or empty pages based on the data storing status. For example, in block B4 of the data area 208, pages P0 through P2, and pages P4 and P5 are defined as valid data pages, and page P3 is defined as invalid data page. In block P7, page P0, and pages P2 through P5 are valid data pages and page P1 is invalid data page. In block B8, pages P0 through P2 are valid data pages and pages P3 through P5 are empty pages. It should be noted that the page amount of a block is determined by initial configuration while manufacturing. In the present invention, one block is composed of, but is not limited to, 6 pages. For example, one block is composed of 64 or 128 pages, or arbitrary amount of pages.

Specifically, the recording area 206a has at least one recording page for recording a plurality of invalid data page messages. For example, the invalid data page messages of the invalid data pages in each block of the data area 208 are recorded in the recording page. The invalid data page messages of page P3 of block B4 (B4: P3), pages P1~P3 and P5 of block B5 (B5: P1~P3, P5), pages P1 and P5 of block B6 (B6: P1, P5), and page P1 of block B7 (B7: P1) are recorded in the recording area 206a. The empty spare area 206b is used to record the correct invalid data page messages for re-arranging the recording area 206a while the recording area 206a is or will be full of invalid data page messages. For example, the correct invalid data page messages P1~P5 in block B0 are stored in block B2 of the empty spare area 206b. The block B0 is then erased wherein block B2 is assigned to be the block of the recording area 206a and block B0 is assigned to be the block of the empty spare area 206b. More specifically, the block number of the recording area 206a and physical block number of the empty spare area 206b can be changed when the invalid data page messages are stored in different positions of the reserved area 206. The buffer 207 temporarily stores and accumulates the invalid data page messages to record the invalid data page messages into the recording area 206a at a time while the buffer 207 is written to be full of invalid data page messages. Additionally, the empty spare area 206b may serve as the temporary area, e.g. block B7, while the data area 208 updates the data.

Figure 1B:
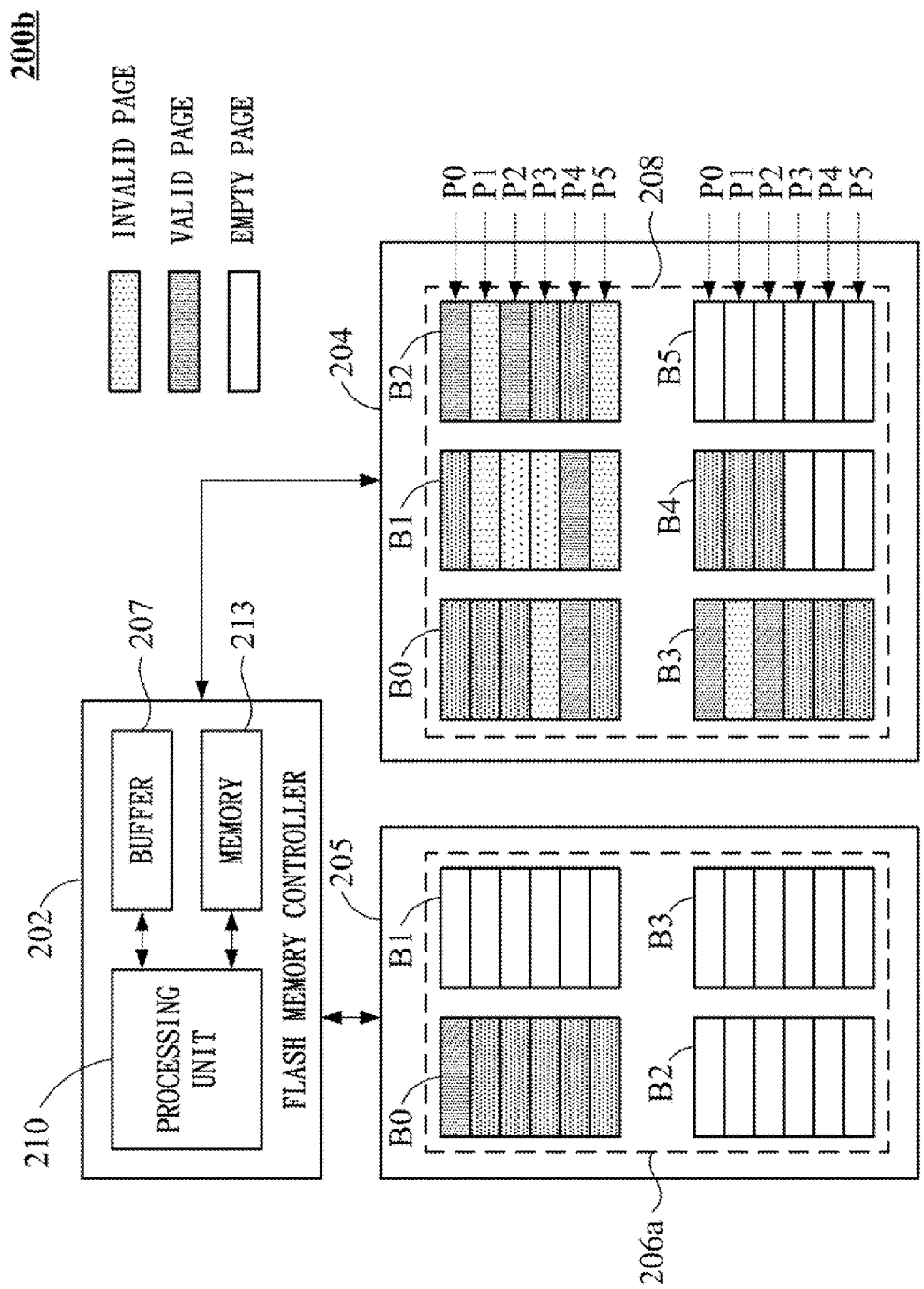
FIG. 1B is a schematic block diagram of a management system of the invalid data page messages in the flash memory according to a second embodiment of the present invention.

FIG. 1B is a schematic block diagram of a management system 200b of the invalid data page messages in the flash memory according to a second embodiment of the present invention. The management system 200b in FIG. 1B is similar to the management system 200a in FIG. 1A and their difference is that the recording area 206a of the management system 200b is disposed in storage device 205 and outside the flash memory 204. The management system 200b includes a flash memory controller 202, a flash memory 204 coupled to the flash memory controller 202, and a storage device 205 coupled to the flash memory controller 202 wherein the storage device 205 may be a non-volatile storage device. The flash memory controller 202 further includes a processing unit 210, a buffer 207 and a memory 213 respectively coupled to the processing unit 210. The flash memory 204 is composed of a data area 208 having a plurality of blocks B0 through B5. For example, pages P0~P2, P4 and P5 in block B0 are valid data pages and page P3 is invalid data page, and pages P0 and P4 in block B1 are valid data pages and pages P1~P3 and P5 are invalid data pages. The storage device 205 is composed of recording 206a having blocks B0~B3. For example, pages P0~P5 in block B0 of the storage device 205 record the invalid data page messages of invalid data pages in each of blocks of data area 208. When the recording area 206a is or almost is full of invalid data page messages, the block B0 is re-arranged.

Figure 1C:
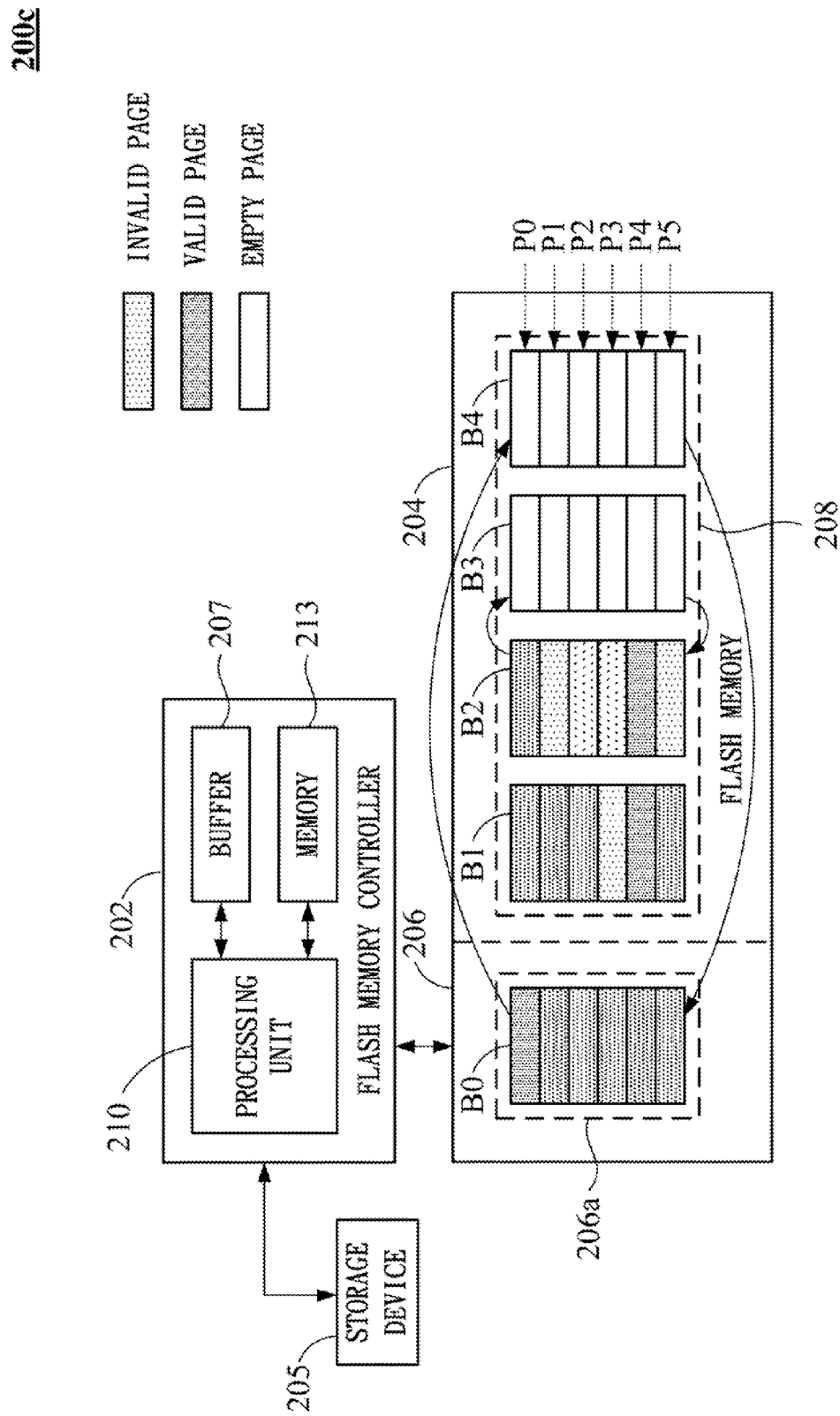
FIG. 1C is a schematic block diagram of a management system of the invalid data page messages in the flash memory according to a third embodiment of the present invention.

FIG. 1C is a schematic block diagram of a management system 200c of the invalid data page messages in the flash memory according to a third embodiment of the present invention. The management system 200c in FIG. 1C is similar to the management system 200a in FIG. 1A and their difference is the structure of the flash memory 204. In FIG. 1C, the flash memory 204 is composed of a reserved area 206 and data area 208 wherein the reserved area 206 has recording area 206a. For example, pages P0~P5 in block B0 of the recording area 206a record the data comprising the invalid data page messages of invalid data pages in each of blocks of data area 208. The data area 208 further includes an empty block B3 which serves as temporary block for moving the valid data of block B2 to the empty block B3 for re-arranging the block B2. The data area 208 further includes an empty block B4 which serves as temporary block for moving the valid data of block B0 to the empty block B4 for re-arranging the block B0. In other words, the empty blocks of the data area 208 serves as the temporary blocks of data movement for the recording area 206a and the data area 208. When the block B0 of the recording area 206a is or almost is full of invalid data page messages, the correct invalid data page messages in the recording area 206a is copied to the empty blocks for re-arranging the recording area 206a.

Figure 1D:
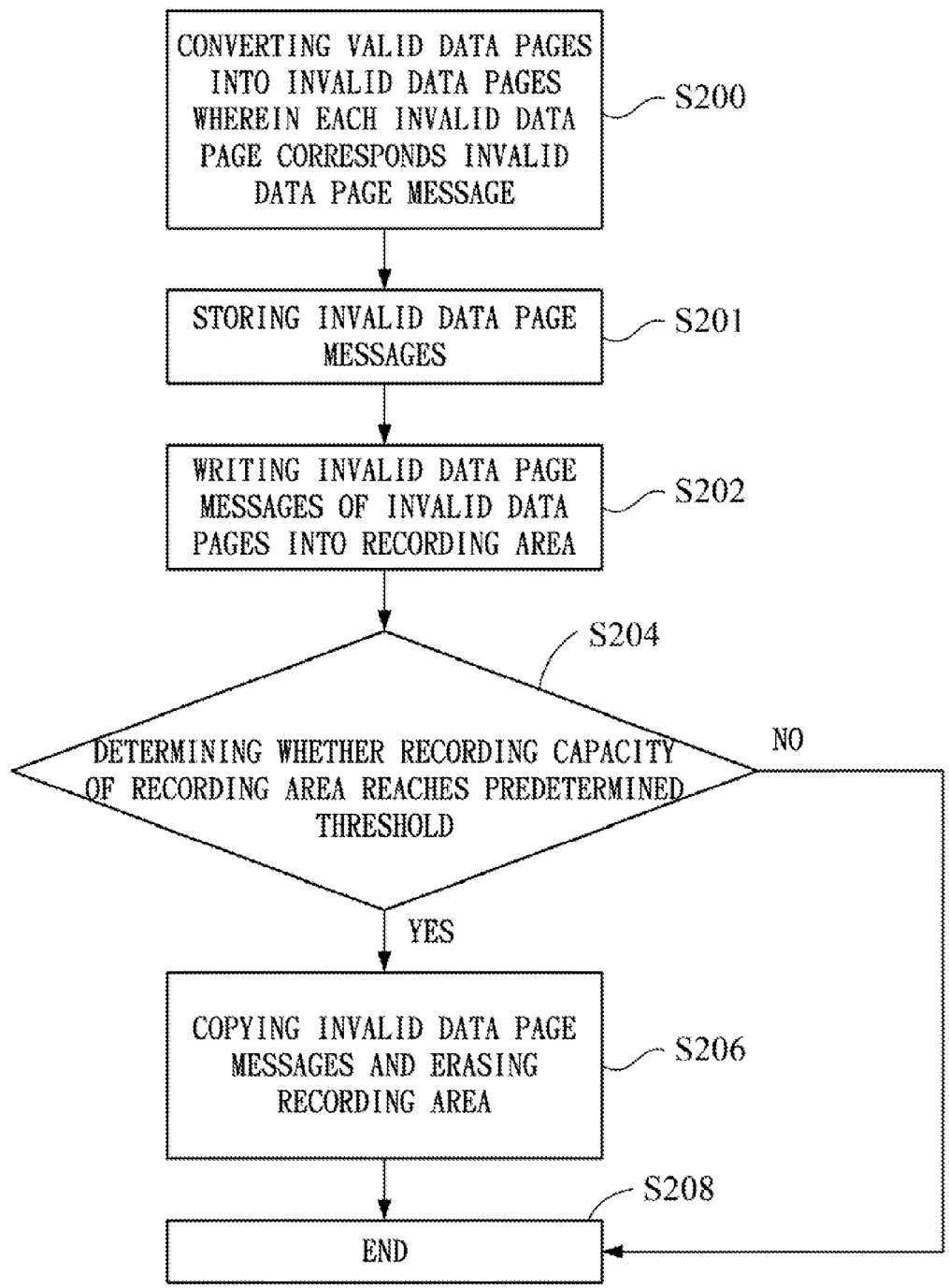
FIG. 1D is a flow chart of managing the invalid data page messages in the flash memory according to one embodiment of the present invention.
Figure 2A:
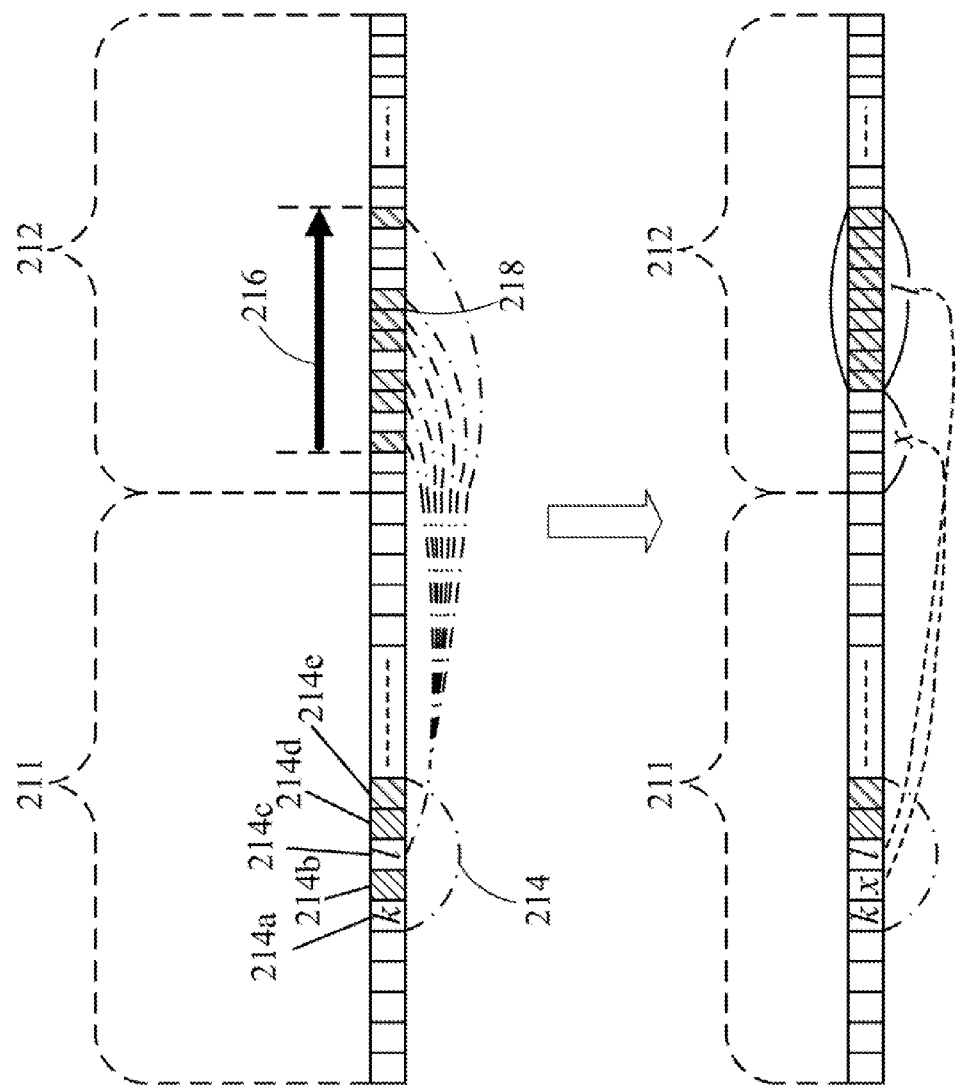
FIG. 2A is a schematic view of the data structure of the buffer according to one embodiment of the present invention.

Please refer to FIG. 1A, FIG. 1D and FIG. 2A. FIG. 1D is a flow chart of managing the invalid data page messages in the flash memory 204 according to one embodiment of the present invention. FIG. 2A is a schematic view of data structure of the buffer 204 according to one embodiment of the present invention. The flash memory 204 has a plurality of valid data pages and a plurality of empty pages. The managing method includes the following steps.

In step S200, when executing a updated procedure of the valid data pages, the updated data of the valid data pages are written into the empty pages and the previous valid data pages are converted into, i.e. regarded as, the invalid data pages, wherein each of the invalid data pages corresponds an invalid data page message. Specifically, when the different data versions are sequentially written to the page with the same logical address based on time period, the different physical page addresses store the different data versions corresponding to the same logical address wherein the physical page address corresponding to the latest data version is defined as a valid data page and the former data versions before the latest data version are regarded as invalid data page. That is, the plurality of physical pages corresponding to the former data versions are changed from valid status to invalid status when the physical pages are sequentially updated by the former data versions.

In step S201, the buffer 207 temporarily stores the invalid data page messages and the invalid data page messages of the invalid data pages in the buffer 207 are preferably written into a recording area 206a at a time. In other words, the recording unit of the buffer 207 is preferably the same as the unit of the recording capacity of the recording area 206a so that the invalid data page messages are recorded into the recording area 206a at a time after the buffer 207 is fully written by the invalid data page messages. In another case, the recoding capacity of the recording area 206a is the integral multiple of a recoding capacity of the buffer 207, e.g. Random Access Memory (RAM).

In step S202, the invalid data page messages of the invalid data pages are written into a recording area 206a. As shown in FIG. 2A, the recording area 206a further includes a log directory 211 and a log content 212 corresponding to the log directory 211. The log directory 211 has a plurality of message sections 214 and the log content 212 has a plurality of sets of address fields 216 corresponding to the message sections 214 respectively wherein each of set of address fields 216 is composed of a plurality of address fields 218. Each of the message sections 214 has a region indicator 214a, a starting recording position 214b, a recording length 214c, a total recording amount 214d and a previous version pointer 214e. The recording capacity of the recording area 206a can be configured to but not limited to a predetermined capacity. The recording capacity of the recording area 206a is preferably equal to at least one page size of the flash memory.

In step S204, it is determined whether it is required to re-arrange the recoding area 206a. If yes, proceed to step S206 and if no, proceed to step S208. Specifically, it is determined whether the recording capacity of the recording area 206a reaches a predetermined threshold. If yes, proceed to step S206 and if no, proceed to step S208. For example, the predetermined threshold is less than or equal to the recording capacity of the recording area 206a. Further, the predetermined threshold is preferably the integral multiple of at least one page of the flash memory 204.

In step S206, when the invalid data page messages in the recording area 206a is valid and correct, the correct invalid data page messages are copied to the pages of empty blocks in the empty spare area 206b and the physical blocks of the recording area 206a are erased if the flash memory 204 is NAND flash memory for example. Further, the recording area 206a refers to the blocks having the correct invalid data page messages and the erased physical blocks are assigned to empty spare area 206b. When the invalid data page messages are invalid and incorrect, the incorrect invalid data page messages are over-written by the latest invalid data page messages if the flash memory 204 is NOR flash memory for example.

In step S208, an end step is performed.

The method of managing a plurality of invalid data pages in a flash memory of the present invention further comprises a plurality of recording area 206a for recording the invalid data page messages of the blocks in the data area 208 of the flash memory 204 and for accessing the recording area 206a via multiple channels so that the address information of the invalid data pages can be rapidly accessed within the flash memory 204 with mass capacity.

According to the above-mentioned descriptions, when the valid data pages are changed to invalid data pages in the flash memory 204, the method of managing a plurality of invalid data pages in a flash memory 204 of the present invention utilizes recording area 206a and the buffer 207 for recording the address information of the invalid data pages to effectively manage the large amount of invalid data page messages in the flash memory 204.

FIG. 2A is a schematic view of data structure within the buffer 207 according to one embodiment of the present invention. The address information temporarily stored in the buffer 207 includes a log directory 211 and a log content 212 corresponding to the log directory 211, wherein the log directory 211 has a plurality of message sections 214 and the log content 212 has a plurality of sets of address fields 216 corresponding to the message sections 214 respectively wherein each of set of address fields 216 is composed of a plurality of address fields 218 and each address field 218 records a invalid data page message with address information. Each of the message sections 214 has a region indicator (termed as "k") 214a, a starting recording position (termed as "x") 214b, a recording length (termed as "l") 214c, a total recording amount (termed as "d") 214d and a previous version pointer 214e. In one preferred embodiment, the message sections 214 are sequentially arranged according to the order of the region indicator 214a in an ascending or a descending manner. The total recording amount 214d represents the sum of the recording lengths 214c in the log directory 211.

When the processing unit 210 sorts the log content 212 of the buffer 207 based on the region indicator 214a for generating the recording length 214c in each of the message sections 214 corresponding to each of the sets of address fields 216 and arranging the sets of address fields 216 based on the order of the region indicators 214a. In one preferred embodiment, before the address information temporarily stored in the buffer 207 are copied to the recording area 206a, the log content 212 associated with the address information temporarily stored in the buffer 207 are sorted. Such the manner is capable of increasing the reading efficiency to the recording area 206a since the address information of the log content 212 in the recording area 206a is continuously arranged. In one embodiment, the recording area 206a is disposed in the flash memory 204, as shown in FIG. 1A. Moreover, the starting recording position "x" 214b of each message section 214 corresponds to a filed length of each set of address fields 216 and the starting recording position of the recoding content 212.

Figure 2B:
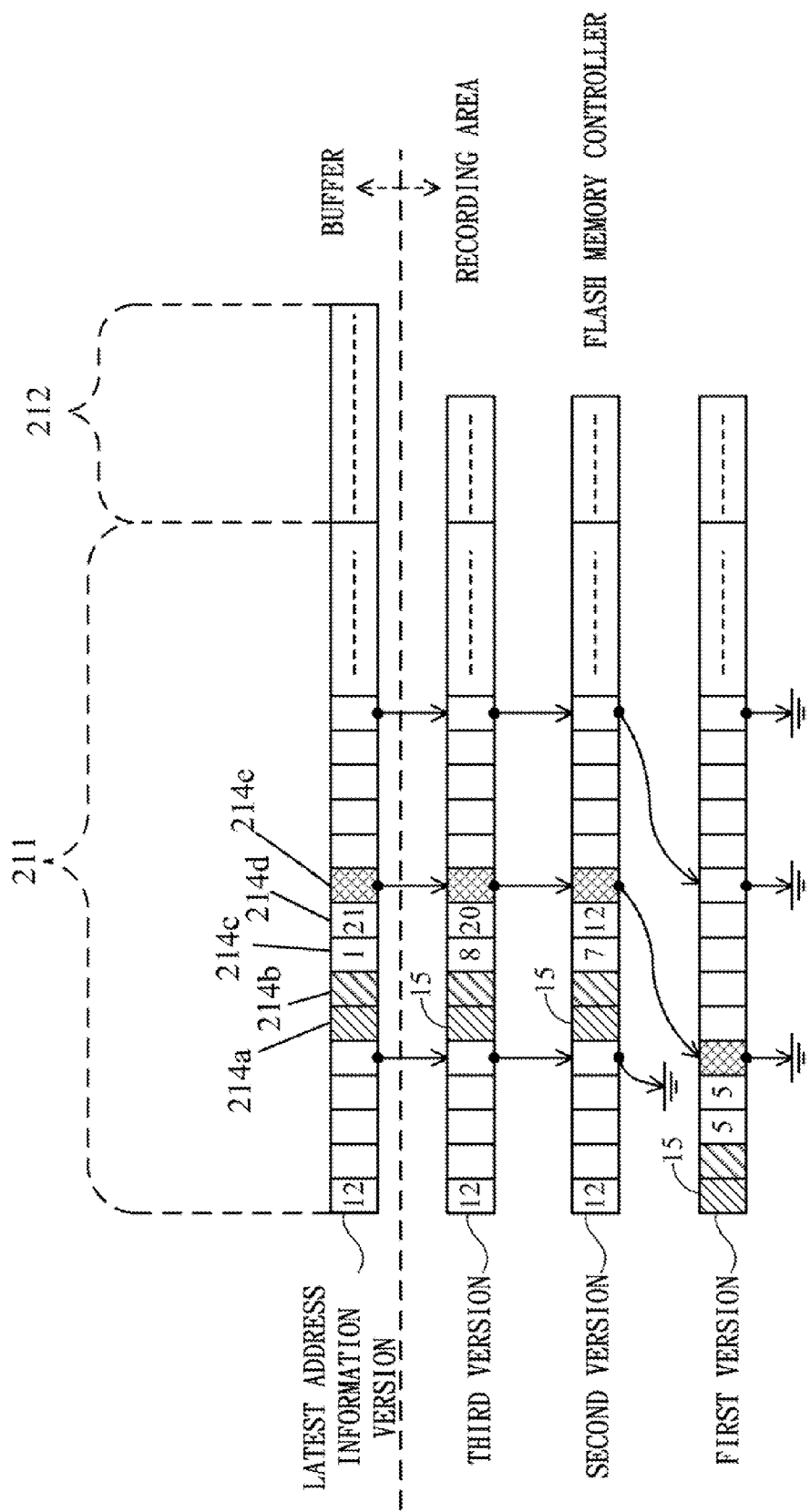
FIG. 2B is a schematic view of the linked data structure of the address information with various versions in the buffer and the recording area according to one embodiment of the present invention.

FIG. 2B is a schematic view of the linked data structure of the address information with various versions in the buffer 207 and the recording area 206a according to one embodiment of the present invention. The buffer 207 includes a latest address information version and the recording area 206a includes three address information versions of a datum in the flash memory 204. That is, the datum is updated twice after the datum is written into the recording area 206a once and the datum is stored in different physical address with respect to the three address information versions. Specifically, in the first version of address information, the message section 214 with the region indicator "15" 214a records the address information having five sets of invalid data page messages, the accumulated total recording amount 214d is five, and the previous version pointer 214e refers to zero which is regarded as the first address information version. In the second version of address information, the message section 214 with the region indicator "12" 214a is inserted before the message section 214 with the region indicator "15" 214a, the message section 214 with the region indicator "15" 214a records the address information having seven sets of invalid data page messages, the accumulated total recording amount 214d is twelve, and the previous version pointer 214e refers to the previous version pointer 214e of the first version of address information. Similarly, in the third version of address information, the message section 214 with the region indicator "15" 214a records the address information having eight sets of invalid data page messages, the accumulated total recording amount 214d is twenty, and the previous version pointer 214e refers to the previous version pointer 214e of the second version of address information. In the latest address information version of the buffer 207, the message section 214 with the region indicator "15" 214a records the address information having one set of invalid data page messages, the accumulated total recording amount 214d is twenty-one, and the previous version pointer 214e refers to the previous version pointer 214e of the third version of address information.

In other words, the buffer 207 further stores the log directory 211 and the log content 212 of a current version and the recording area 206a further stores the log directory 211 and the log content 212 of at least one previous version. The log directory 211 of the current version is sequentially linked to the log directory 211 of the at least one previous version according to the previous version pointer 214e for connecting the message sections 214 with the same region indicator 214a. That is, the message sections 214 with the region indicator "15" 214a having different versions are connected according to the versions order so that all the message sections 214 with the region indicator "15" 214a can be found based on the previous version pointer 214e.

Figure 2C:
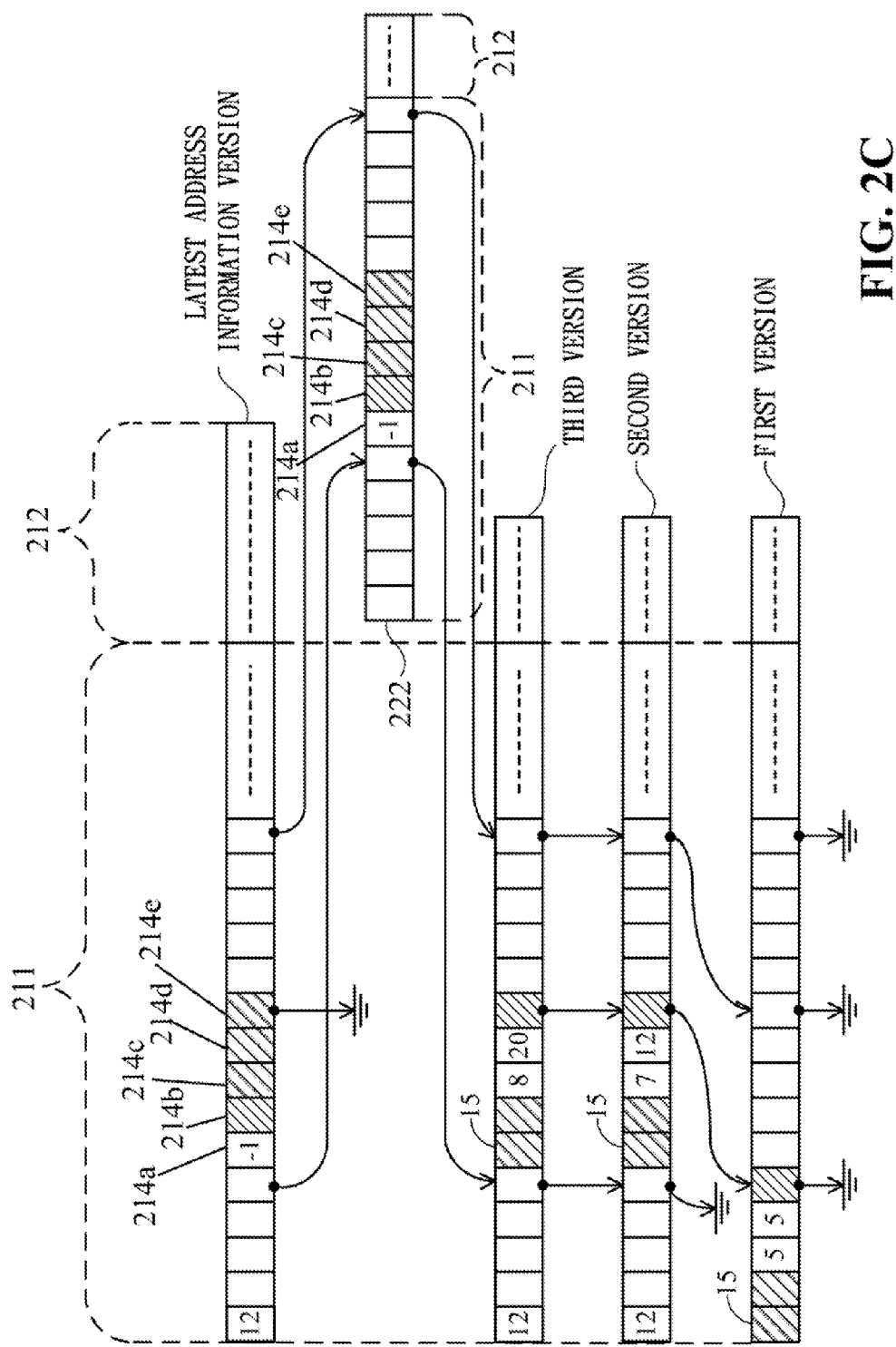
FIG. 2C is a schematic view of the linked data structure of the buffer and the recording area with the collected recording according to one embodiment of the present invention.
Figure 3:
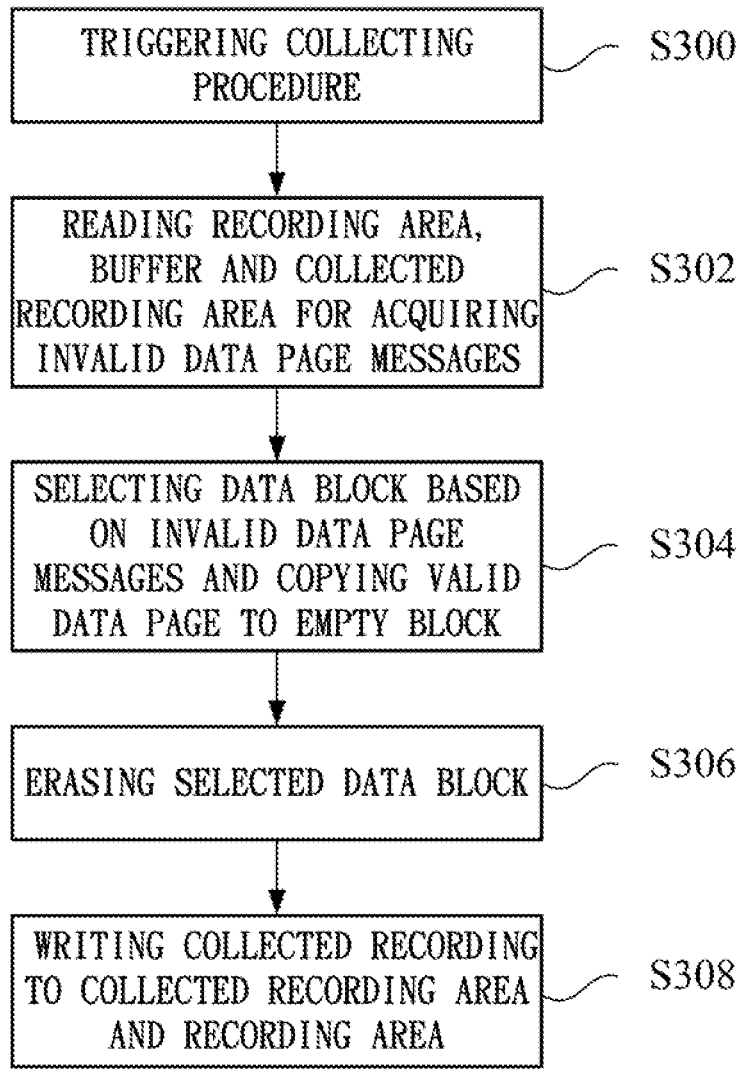
FIG. 3 is a flow chart of collecting the invalid data page messages in the flash memory according to one embodiment of the present invention.

Please refer to FIGS. 2A-2C and FIG. 3. FIG. 2C is a schematic view of the linked data structure of the buffer 207 and the recording area 206a with the collected recording area 222 according to one embodiment of the present invention. FIG. 3 is a flow chart of collecting the invalid data page messages in the flash memory 204 according to one embodiment of the present invention. For example, the recording area 206a includes three versions of address information, as shown in FIG. 2A. The present invention provides a method of collecting a plurality of invalid data pages in a flash memory, wherein the flash memory has a plurality of blocks comprising at least one data block and at least one empty block and wherein the at least one data block comprises a plurality of invalid data pages and a plurality of valid data pages. The method includes the following steps.

In step S300, triggering a collecting procedure for execution.

In step S302, accessing a recording area 206a, a buffer 207 and a collected recording area 222 of the flash memory 204 for acquiring a plurality of invalid data page messages.

The collected recording area 222 further includes a log directory 211 and a log content 212 corresponding to the log directory 211. The log directory 211 has a plurality of message sections 214 and the log content 212 has a plurality of sets of address fields 216 corresponding to the message sections 214 respectively wherein each of set of address fields 216 is composed of a plurality of address fields 218. Each of the message sections 214 has a region indicator 214a, a starting recording position 214b, a recording length 214c, a total recording amount 214d and a previous version pointer 214e. In one case, the collected recording area 222 may be integrated with the recording area 206a. For example, the collected recording area 222 is disposed in the flash memory 204 and the memory 213 in the flash memory controller 202 may be phase change memory (PCM) and/or permanent storage device, e.g. non-volatile memory.

In step S304, selecting the data block based on the invalid data page messages and the valid data page of the data block is copied to the empty block. In one embodiment, the data block is selected if the invalid data pages indicated by the invalid data page messages are greater than a predetermined amount for collecting the selected data block, or the data block is selected if the erasing times of the selected data block are greater than a predetermined value for collecting the selected data block.

In step S306, erasing the selected data block.

In step S308, writing a collected recording into the collected recording area 222 and/or the recording area 206a. For example, when collected recording is written to the collected recording area 222, the region indicator of the message section 214 of the collected recording area 222 is changed to negative one (−1) to erase the collected region indicator in the recording area 206a. Thus, the invalid data page messages associated with the collecting region indicator is valid and correct no more, i.e. invalid and incorrect. In other words, the previous version pointer 214e of the message section 214 in the next version, e.g. latest address information version, refers to null for interrupting the link between the current version and the next version with the region indicator in the invalid data page message.

Specifically, while performing the collecting method of steps S300 through S308, the flash memory controller 202 utilizes invalid data page messages in the recording area 206a, buffer 207 and the collected recording area 222 to selects the desired data block for collecting procedure. Since the flash memory 204 is erased by block, the data block is selected if the invalid data pages indicated by the invalid data page messages are greater than a predetermined amount for collecting the selected data block, or the data block is selected if the erasing times of the selected data block are greater than a predetermined value for collecting the selected data block. The valid data pages in the selected data block are copied to an empty block for reservation. Further, the selected data block is erased for converting the invalid data pages into non-invalid data pages to be recorded in the collected recording area 222 for resetting the collected invalid data page messages. In one embodiment, the region indicator 214a of the message section 214 of the collected recording area 222 is changed to negative one (−1). The previous version pointer 214e of the message section 214 in the next version of the collected recording area is referred to null. Alternatively, the region indicator 214a in the latest address information version is changed to negative one (−1) and the values of the starting recording position 214b, the recording length 214c and the total recording amount 214d are changed to negative one (−1).

Based on the above descriptions, the flash memory system and managing and collecting methods for flash memory with invalid page messages thereof collects and tracks a large amount of invalid data pages of the flash memory by using the address information of the invalid data page messages stored in the recording area while the valid data pages are changed from valid data pages to invalid data pages. Moreover, the flash memory system and managing and collecting methods for flash memory with invalid page messages thereof rapidly selects proper data blocks and identifies the valid data pages in the selected blocks for duplication according to the address information of the invalid data page messages stored in the recording area while performing collecting steps of the flash memory.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A flash memory system, comprising:
a flash memory controller having a processing unit; and
a flash memory coupled to the flash memory controller and having a reserved area and a data area, wherein the reserved area has a recording area and the data area has a plurality of valid data pages and a plurality of invalid data pages, and wherein the processing unit controls the recording area for recording a plurality of invalid data page messages corresponding to the invalid data pages, respectively, and the invalid data page messages represent a plurality of page addresses of the invalid data pages correspondingly;
wherein the recording area further comprises a log directory and a log content corresponding to the log directory, wherein the log directory has a plurality of message sections and the log content has a plurality of sets of address fields corresponding to the message sections respectively, and wherein each of the message sections has a region indicator, a starting recording position, a recording length, a total recording amount and a previous version pointer;
wherein the starting recording position of each message section corresponds to a filed length of each set of address fields and the starting recording position of the recoding content; and
wherein the log directory of the current version is sequentially linked to the log director the at least one previous version according to the previous version pointer for connecting the message sections with the same region indicator.

2. The flash memory system of claim 1, wherein the reserved area further comprises an empty spare area having an empty block for storing the invalid data page messages.

3. The flash memory system of claim 1, wherein the data area further comprises an empty block for temporarily storing the invalid data page messages which are originally stored in the recording area.

4. The flash memory system of claim 1, wherein the flash memory controller further comprises a buffer coupled to the processing unit for temporarily storing and accumulating the invalid data page messages to record the invalid data page messages into the recording area at a time.

5. The flash memory system of claim 4, wherein a recoding capacity of the recording area is an integral multiple of a recoding capacity of the buffer.

6. The flash memory system of claim 1, wherein the buffer further stores the log directory and the log content of a current version.

7. The flash memory system of claim 1, wherein the recording area further stores the log directory and the log content of at least one previous version.

8. The flash memory system of claim 1, wherein the total recording amount represents the sum of the recording lengths in the log directory.

9. The flash memory system of claim 1, wherein the recording area further comprises a collected recording area for storing at least one collected recording.

10. The flash memory system of claim 1, further comprising a non-volatile storage device for storing at least one collected recording of the flash memory.

11. A flash memory system, comprising:
a flash memory controller having a processing unit;
a flash memory coupled to the flash memory controller and having a data area, wherein the data area has a plurality of valid data pages and a plurality of invalid data pages; and
a storage device coupled to the flash memory controller and having a recording area, for recording a plurality of invalid data page messages corresponding to the invalid data pages, respectively, and the invalid data page messages represent a plurality of page addresses of the invalid data pages correspondingly;
wherein the recording area further comprises a log directory and a log content corresponding to the log directory, wherein the log directory has a plurality of message sections and the log content has a plurality of sets of address fields corresponding to the message sections respectively, and wherein each of the message sections has a region indicator, a starting recording position, a recording length, a total recording amount and a previous version pointer;
wherein the starting recording position of each message section corresponds to a filed length of each set of address fields and the starting recording position of the recoding content; and wherein the log directory of the current version is sequentially linked to the log directory of the at least one previous version according to the previous version pointer for connecting the message sections with the same region indicator.

12. The flash memory system of claim 11, wherein the flash memory controller further comprises a buffer coupled to the processing unit for temporarily storing and accumulating the invalid data page messages to record the invalid data page messages into the recording area at a time.

13. The flash memory system of claim 12, wherein a recoding capacity of the recording area is an integral multiple of a recoding capacity of the buffer.

14. The flash memory system of claim 11, wherein the buffer further stores the log directory and the log content of a current version.

15. The flash memory system of claim 11, wherein the recording area further stores the log directory and the log content of at least one previous version.

16. The flash memory system of claim 11, wherein the total recording amount represents the sum of the recording lengths in the log directory.

17. The flash memory system of claim 11, wherein the recording area further comprises a collected recording area for storing at least one collected recording.

18. The flash memory system of claim 11, further comprising a non-volatile storage device for storing at least one collected recording of the flash memory.

19. A method of managing a plurality of invalid data pages in a flash memory wherein the flash memory has a plurality of valid data pages and a plurality of empty pages, the method comprising the steps of:
(a) executing a updating procedure of the plurality of valid data pages;
(b) converting the plurality of valid data pages into a plurality of invalid data pages wherein each of the invalid data pages has an invalid data page message, wherein the invalid data page messages represent a plurality of page addresses of the invalid data pages correspondingly;
(c) writing the invalid data page messages of the plurality of invalid data pages into a recording area, wherein the recording area further comprises a log directory and a log content corresponding to the log directory, wherein the log directory has a plurality of message sections and the log content has a plurality of sets of address fields corresponding to the message sections respectively, and wherein each of the message sections has a region indicator, a starting recording position, a recording length, a total recording amount and a previous version pointer;
(d) determining whether it is required to re-arrange the recoding area, if yes, proceed to step (e) and if no, proceed to step (f);
(e1) sorting the log content of the buffer based on the region indicator for generating the recording length in each of the message sections corresponding to each of the sets of address fields and arranging the sets of address fields based on the order of the region indicators;
(e) re-arranging the recording area; and
(f) end.

20. The method of claim 19, during the step (a), further comprising a step of writing an updating data of the invalid data pages into the empty pages.

21. The method of claim 19, during the step (c), further comprising a step of storing the invalid data page messages to record the invalid data page messages into the recording area at a time.

22. The method of claim 19, wherein a recoding capacity of the recording area is an integral multiple of a recoding capacity of the buffer.

23. The method of claim 19, wherein the starting recording position of each message section corresponds to a filed length of each set of address fields and the starting recording position of the recoding content.

24. The method of claim 19, wherein the buffer further stores the log directory and the log content of a current version and the recording area further stores the log directory and the log content of at least one previous version.

25. The method of claim 24, wherein the total recording amount represents the sum of the recording lengths in the log directory.

26. The method of claim 24, wherein the log directory of the current version is sequentially linked to the log directory of the at least one previous version according to the previous version pointer for connecting the message sections with the same region indicator.

27. The method of claim 19, during the step (d), further comprising a step of determining whether the recording capacity of the recording area reaches a predetermined threshold, if yes, proceed to step (e) and if no, proceed to step (f).

28. The method of claim 27, during the step (e), further comprising determining that the invalid data page messages corresponding to the invalid data pages respectively are valid, copying the invalid data page messages which are correctly corresponding to the invalid data pages to the empty pages, and erasing the recording area.

29. The method of claim 27, wherein during the step (e), if it is determined that the invalid data page messages which are not corresponding to the invalid data pages respectively are invalid and incorrect, the invalid data page messages not corresponding to the invalid data pages respectively are overwritten by latest invalid data page messages.

30. A method of collecting a plurality of invalid data pages in a flash memory, wherein the flash memory has a plurality of blocks comprising at least one data block and at least one empty block and wherein the at least one data block comprises a plurality of invalid data pages and a plurality of valid data pages, the method comprising the steps of:
(a) triggering a collecting procedure;
(b) accessing a recording area of the flash memory for acquiring a plurality of invalid data page messages, wherein the invalid data page messages represent a plurality of page addresses of the invalid data pages correspondingly;
(c) selecting the data block based on the invalid data page messages and copying the valid data page of the data block to the empty block, and during the step (c), further comprising a step of either selecting the data block if the invalid data pages indicated by the invalid data page messages are greater than a predetermined amount for collecting the selected data block or selecting the data block if erasing times of the selected data block are greater than a predetermined value for collecting the selected data block; and
(d) erasing the selected data block.

31. The method of claim 30, wherein the recording area further comprises a collected recording area.

32. The method of claim 31, wherein the collected recording area further comprises a log directory and a log content corresponding to the log directory, wherein the log directory has a plurality of message sections and the log content has a plurality of sets of address fields corresponding to the message sections respectively, and wherein each of the message sections has a region indicator, a starting recording position, a recording length, a total recording amount and a previous version pointer.

33. The method of claim 32, wherein the region indicator of the message section of the collected recording area is changed to negative one (−1).

34. The method of claim 32, wherein the previous version pointer of the message section in a next version of the collected recording area is referred to null.

* * * * *